(12) United States Patent
Yokoyama (10) Patent No.: US 9,020,260 B2
(45) Date of Patent: Apr. 28, 2015

(54) IMAGE PROCESSING APPARATUS, IMAGE PROCESSING METHOD AND RECORDING MEDIUM

(75) Inventor: Yoshimasa Yokoyama, Hachiouji (JP)

(73) Assignee: Casio Computer Co., Ltd., Tokyo (JP)

( * ) Notice: Subject to any disclaimer, the term of this patent is extended or adjusted under 35 U.S.C. 154(b) by 497 days.

(21) Appl. No.: 13/554,260

(22) Filed: Jul. 20, 2012

(65) Prior Publication Data

US 2013/0028523 A1 Jan. 31, 2013

(30) Foreign Application Priority Data

Jul. 25, 2011 (JP) .................................. 2011-162279

(51) Int. Cl.
*G06T 7/00* (2006.01)
*G06T 11/60* (2006.01)

(52) U.S. Cl.
CPC ............... *G06T 11/60* (2013.01); *G06T 7/0083* (2013.01)

(58) Field of Classification Search
None
See application file for complete search history.

(56) References Cited

U.S. PATENT DOCUMENTS 5,471,535 A * 11/1995 Ikezawa et al. ................ 382/199
5,815,596 A * 9/1998 Ahuja et al. ................... 382/173
5,881,170 A * 3/1999 Araki et al. .................... 382/199
6,034,759 A * 3/2000 Enomoto ......................... 355/41
6,289,110 B1 * 9/2001 Kim et al. ...................... 382/103
6,300,955 B1 * 10/2001 Zamir ............................. 382/283
6,621,924 B1 * 9/2003 Ogino et al. ................... 382/165
6,654,497 B1 * 11/2003 Kondo et al. .................. 382/199
6,674,905 B1 * 1/2004 Matsugu et al. ............... 382/199
7,602,993 B2 10/2009 Nishiyama
2004/0042662 A1 * 3/2004 Wilensky et al. .............. 382/194
2006/0262988 A1 * 11/2006 Tek et al. ........................ 382/256
2006/0269141 A1 * 11/2006 Takahashi ...................... 382/199
2009/0128618 A1 * 5/2009 Fahn et al. ....................... 348/39
2013/0121594 A1 * 5/2013 Kawatani et al. .............. 382/199

FOREIGN PATENT DOCUMENTS

| JP | 2006-003603 A | 1/2006 |
| JP | 2008-059540 A | 3/2008 |
| JP | 2008-242533 A | 10/2008 |
| JP | 2011-139329 A | 7/2011 |

OTHER PUBLICATIONS

Japanese Office Action dated Apr. 9, 2013 (and English translation thereof) in counterpart Japanese Application No. 2011-162279.
Etsuro Endo, "Adobe Photoshop A to Z", Japan, BNN, Inc., Feb. 15, 1993, 1st Edition, pp. 60-78 (and partial English translation thereof).

* cited by examiner

*Primary Examiner* — Barry Drennan
(74) *Attorney, Agent, or Firm* — Holtz, Holtz, Goodman & Chick PC (57) ABSTRACT

CPU performs a process to obtain image data, and defines a predetermined range in the obtained image data. Further, CPU extracts outlines of images falling within the predetermined range, and selects a closed line among the extracted outlines. Then, an image processing unit and CPU converts an image surrounded by the selected closed-line into a painterly rendering image.

7 Claims, 9 Drawing Sheets

IMAGE PROCESSING APPARATUS, IMAGE PROCESSING METHOD AND RECORDING MEDIUM

CROSS-REFERENCE TO RELATED APPLICATION

The present application is based upon and claims the benefit of priority from the prior Japanese Patent Application No. 2011-162279, filed Jul. 25, 2011, the entire contents of which are incorporated herein by reference.

BACKGROUND OF THE INVENTION

1. Field of the Invention

The present invention relates to an image processing apparatus, an image processing method and a recording medium having a computer program recorded therein.

2. Description of the Related Art

Conventional image processing is known for converting data of a photographic image designated by a user into data of a painterly rendering image such as a water painting, oil painting, color drawing, and/or a pastel drawing. Some image processing needs several minutes to convert the photographic image into a painterly rendering image. Therefore, a notice of "please, wait for a while" or an icon of an hourglass is displayed on a displaying screen to tell the user of the progress of the converting process, while the image processing is going on. In the case that the data size of the photographic image is large, a problem arises that the user is required to wait for a long time and feels frustration until the photographic image is converted into a painterly rendering image. Even though the data of a painterly rendering image has been obtained after the user waits for a long time, since the whole image converting process has done without receiving any operation by the user, sometimes the user cannot have any attachment for the resultant painterly rendering image.

To solve the problems in the conventional image processing, U.S. Pat. No. 7,602,993 (Japanese Patent No. 2006-3603 A) has proposed a technique, in which an image is divided into two areas; one area of the image is processed; the processed image is combined with the image of the remaining area; and then the whole image is displayed. In the proposed technique, since only the data of the divided area from the original image is processed, a time required for the image processing is shorter than the case where the whole image is processed.

But in the technique disclosed in U.S. Pat. No. 7,602,993, since the original image to be processed is divided into plural areas with a dividing border line, the resultant image includes the processed image divided with the border line, giving an uncomfortable feeling.

SUMMARY OF THE INVENTION

In consideration of the above problems, the present invention has been made to provide a technique that reduces a time required in the image processing to convert image data into painterly-rendering image data, and meanwhile generates a clear photographic image merged with a painterly rendering image converted with the user's feeling incorporated, providing the user with specific appreciating enjoyment, which the user cannot enjoy when viewing the photographic image and the painterly rendering image separately.

According to one aspect of the invention, therein provided an image processing apparatus, which comprises a selection-range setting unit for defining a predetermined range in an obtained image, an outline extracting unit for extracting outlines of images falling within the predetermined range defined by the selection-range setting unit, a closed-line selecting unit for selecting a closed line from among the outlines extracted by the outline extracting unit, and a picture converting unit for converting an image surrounded by the closed line selected by the closed-line selecting unit into a painterly rendering image.

According to another aspect of the invention, therein provided an image processing method in an image processing apparatus for converting image data into data of a painterly rendering image, the method, which comprises defining a predetermined range in an obtained image, extracting outlines of images falling within the defined predetermined range, selecting a closed line from among the extracted outlines of images, and converting an image surrounded by the selected closed-line into a painterly rendering image.

According to still another aspect of the invention, there is provided a computer readable recording medium to be mounted on an image processing apparatus provided with a computer, the recording medium having recorded thereon a computer program when executed to make the computer implement a function, wherein the function, which comprises a selection-range setting unit for defining a predetermined range in an obtained image, an outline extracting unit for extracting outlines of images falling within the predetermined range defined by the selection-range setting unit, a closed-line selecting unit for selecting a closed line from among the outlines extracted by the outline extracting unit, and a picture converting unit for converting an image surrounded by the closed line selected by the closed-line selecting unit into a painterly rendering image.

BRIEF DESCRIPTION OF THE DRAWINGS

FIG. 1a and FIG. 1b are views for explaining the outline of an image processing apparatus according to the invention.

FIG. 7a and FIG. 7b are views for explaining the outline of the function of an application of the image processing apparatus different from the image processing apparatus according to the embodiment of the invention.

DETAILED DESCRIPTION OF THE PREFERRED EMBODIMENTS

Now, the image processing apparatus according to the embodiment of the present invention will be described in detail with reference to the accompanying drawings. For easy understanding of the embodiment of the invention, an outline of the image processing apparatus according to the invention will be described.

Figure 1A:
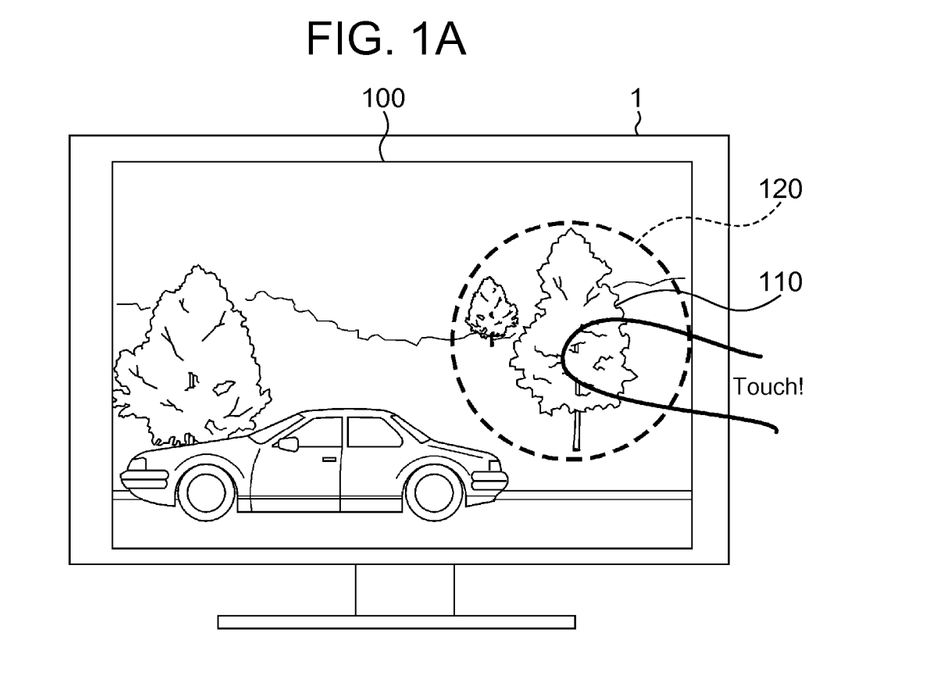
FIG. 1a is a view showing a photographic image displayed on an output unit of the image processing apparatus according to the embodiment of the invention.
Figure 1B:
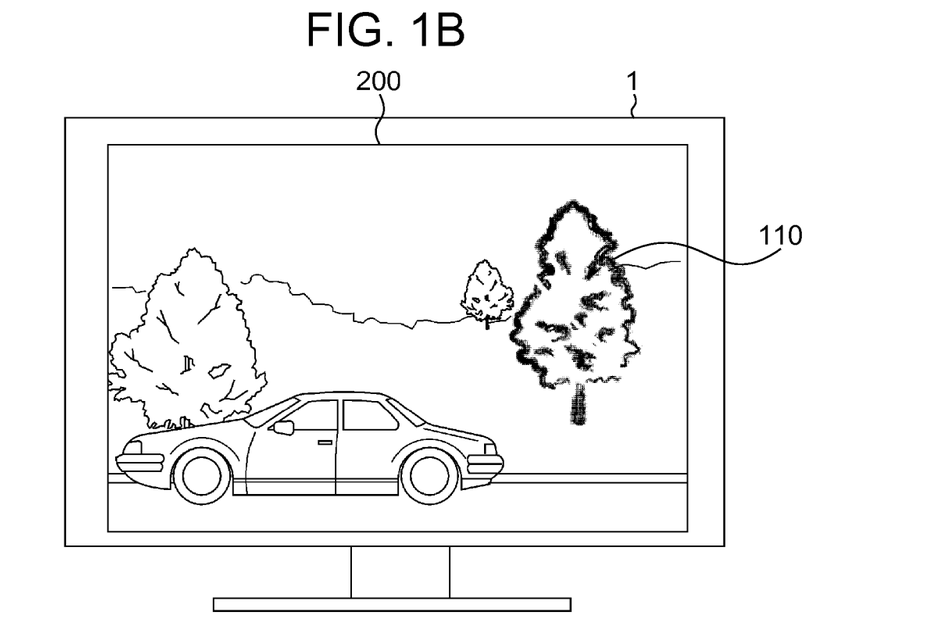
FIG. 1b is a view showing a painterly rendering image displayed on the output unit of the image processing apparatus according to the embodiment of the invention.

FIG. 1a and FIG. 1b are views for explaining the outline of the image processing apparatus 1 according to the embodiment of the invention. The image processing apparatus 1 according to the present embodiment is constructed or used, for instance, as a so-called digital photo-frame. The image processing apparatus 1 has a picture conversion mode, and converts image data of a photographic image into a painterly rendering image in the picture conversion mode.

In the present embodiment of the invention, the "picture conversion mode" is one of the functions which the image processing apparatus 1 provides, and converts a part of image data of a photographic image into a painterly rendering image based on a user's operation, displaying the painterly rendering image. In addition to the picture conversion mode, the image processing apparatus 1 has a normal mode, which successively switches plural pieces of stored image data to data to be displayed, and successively displays images of the plural pieces of data like a slide show.

The "photographic image" is an image represented by image data, which is generated by taking a picture with an image pick-up apparatus or a digital camera. The "painterly rendering image" is an image represented by image data, which is obtained when at least a part of image data of a photographic image has been subjected to a painterly-rendering conversion process in the image processing apparatus 1.

FIG. 1a is a view showing a photographic image 100 displayed on an output unit of the image processing apparatus 1 according to the present embodiment of the invention.

FIG. 1b is a view showing a painterly rendering image 200 displayed on the output unit of the image processing apparatus 1 according to the present embodiment of the invention.

The image processing apparatus 1 is provided with a touch panel, which serves as the output unit and/or input unit. The image processing apparatus 1 displays an image on the touch panel, and receives a touching or closing operation (hereinafter, a "touch operation") of the user on the touch panel with his or her finger or a touch pen. As shown in FIG. 1a, when a specific object 110 in the photographic image 100 displayed on the output unit is touched, the image processing apparatus 1 sets and displays a circular area 120 having the center at the area where the touch operation is effected. The image processing apparatus 1 extracts the outline of an image within the circular area 120 and recognizes a closed line formed by the outline as the specific object 110 selected by the user. Further, the image processing apparatus 1 performs a picture converting process only on the image data of the part surrounded by the closed line, and displays on the output unit an image represented by the obtained image data, that is, displays on the output unit the painterly rendering image 200 with only the specific object 110 converted into a painterly rendering image, as show in FIG. 1b.

Figure 2:
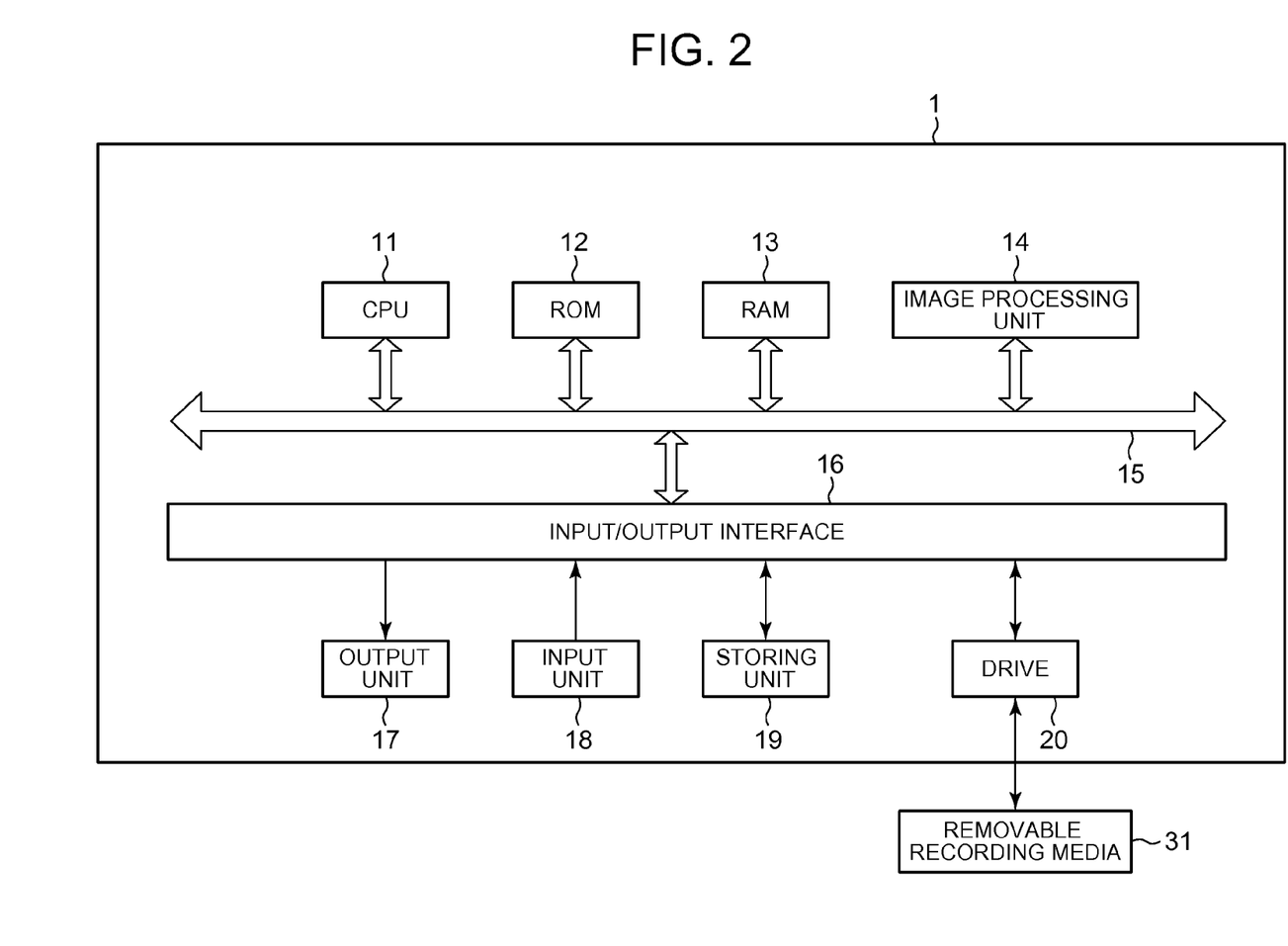
FIG. 2 is a view showing a configuration of the image processing apparatus according to the embodiment of the invention.

FIG. 2 is a view showing a configuration of hardware of the image processing apparatus 1 according to the embodiment of the invention. The image processing apparatus 1 comprises CPU (Central Processing Unit) 11, ROM (Read Only Memory) 12, RAM (Random Access Memory) 13, an image processing unit 14, a bus 15, an input/output interface 16, the output unit 17, the input unit 18, a storing unit 19, and a drive 20.

CPU 11 runs a program recorded in ROM 12 or a program loaded onto RAM 13 from the storing unit 19 to perform various sorts of processes.

RAM 13 stores data required for CPU 11 to perform the various sorts of processes.

The image processing unit 14 comprises DSP (Digital Signal Processor) and VRAM (Video Random Access Memory), and cooperates with CPU 11 to perform the various sorts of image processes on image data.

For instance, the image processing unit 14 performs various image processes including a noise reduction process, a tint controlling process, and the picture converting process on image data stored in the storing unit 19.

CPU 11, ROM 12, RAM 13 and the image processing unit 14 are connected with each other through the bus 15. The input/output interface 16 is also connected to the bus 15. To the input/output interface 16 are connected the output unit 17, the input unit 18, the storing unit 19 and the drive 20.

The output unit 17 comprises a display device and a speaker to output images and sounds. The input unit 18 includes various buttons. The input unit 18 inputs various sorts of information in response to the user's operation of the buttons. In the image processing apparatus 1 according to the present embodiment, a liquid crystal display panel of a touch panel type, which comprises a touch sensor stacked on a display device, is used as the output unit 17 and/or the input unit 18.

The storing unit 19 comprises DRAM (Dynamic Random Access Memory), which stores image files of various sorts of data including photographic images to be subjected to the painterly-rendering conversion process, painterly rendering images subjected to the painterly-rendering conversion process, and images to be displayed for the slide show. In other words, the storing unit 19 serves as a built-in memory among memories for storing image files.

The drive 20 receives a removable recording medium 31, such as a magnetic disk, an optical disk, a magnet-optical disk, and/or a semi-conductor memory. A program read from the removable recording medium 31 by the drive 20 is installed onto the storing unit 19 as needed. The removable recording medium 31 can record various sorts of data such as the image files stored in the storing unit 19 in a similar manner to the storing unit 19. In other words, the removable recording medium. 31 serves as an image supplying medium for storing new image files to be supplied to the storing unit 19.

Now, the painterly-rendering conversion process performed by CPU 11 in the image processing apparatus 1 according to the present embodiment will be described with reference to the flow charts shown in FIG. 3 to FIG. 6. FIG. 3 to FIG. 6 are the flow charts for explaining the painterly-rendering conversion process performed by CPU 11 in the image processing apparatus 1 according to the present embodiment.

Figure 3:
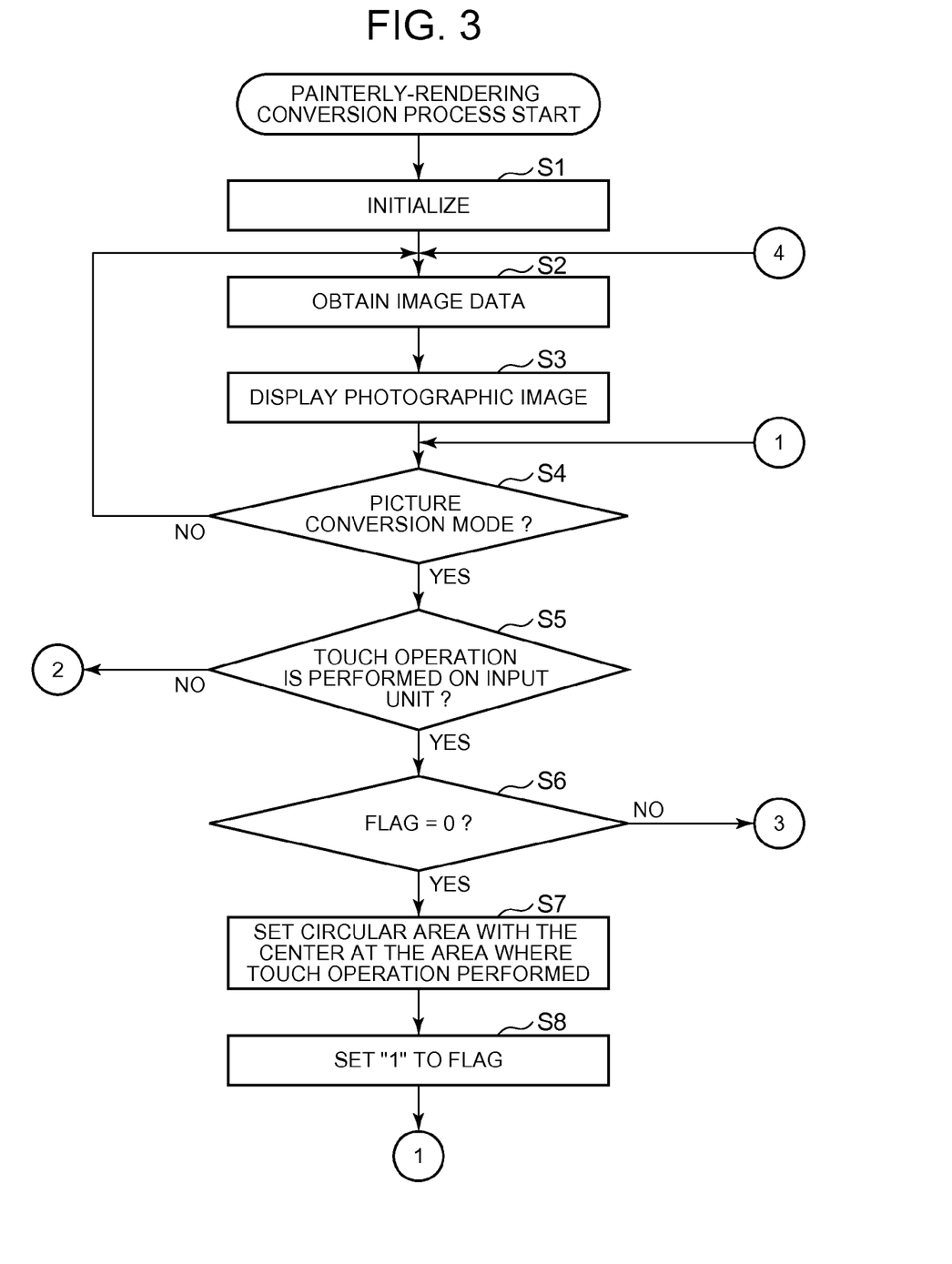
FIG. 3 to FIG. 6 are flow charts of a painterly-rendering conversion process performed by CPU in the image processing apparatus according to the embodiment of the invention.

First, the processes at step S1 to step S8 will be described with reference to the flow chart shown in FIG. 3.

When the power is turned on in the image processing apparatus 1, CPU 11 reads various sorts of parameters necessary to display an image on the output unit 17 (step S1).

CPU 11 obtains image data of a photographic image stored in the storing unit 19 (step S2). In other words, CPU 11 performs the process at step S2 to serve as an obtaining unit for obtaining the image data. CPU 11 displays on the output unit 17 a photographic image represented by the image data obtained at step S2 (step S3).

CPU 11 judges whether or not the picture conversion mode has been set in the image processing apparatus 1 (step S4). When it is determined that the picture conversion mode has been set (YES at step S4), CPU 11 advances to step S5. When it is determined that the picture conversion mode has not been set (NO at step S4), CPU 11 returns to step S2.

When it is determined YES at step S4, CPU 11 judges whether or not a user has performed the touch operation on the input unit 18 (step S5). When it is determined that the touch operation has been performed (YES at step S5), CPU 11 advances to step S6. When it is determined that the touch operation has not been performed (NO at step S5), CPU 11 advances to step S9 in FIG. 4.

In the present process, the tough operation includes, for instance, a "selection touch operation", an "enlarging touch operation" and a "reducing touch operation".

The "selection touch operation" is the user's touch operation to touch a specific area in a photographic image displayed on the input unit 18 with his or her finger tip, as shown in FIG. 1*a*.

The "enlarging touch operation" is the user's touch operation to touch the circular area 120 (Refer to FIG. 1*a*) displayed on the input unit 18 with his or her two finger tips and slide the two finger tips to spread them.

The "reducing touch operation" is the user's touch operation to touch the circular area 120 (Refer to FIG. 1*a*) displayed on the input unit 18 with his or her two finger tips and slide the two finger tips to move them closer.

When it is determined that the touch operation has been performed or when the user touches the input unit 18 with his or her fingertip (s) (YES at step S5), CPU 11 judges whether or not a flag recorded in the storing unit 19 has been set to "0" (step S6). When it is determined that the flag has been set to "0" (YES at step S6), CPU 11 advances to step S7. When it is determined that the flag has not been set to "0" (NO at step S6), CPU 11 advances to step S17 in FIG. 5. In the present embodiment, the flag indicates whether or not the circular area 120 (Refer to FIG. 1*a*) has been set in the image data of a photographic image. More specifically, when the flag is set to "0", then CPU 11 determines that the circular area 120 has not been set in the image data and meanwhile, when the flag is set to "1", then CPU 11 determines that the circular area 120 has been set in the image data.

When it is determined YES at step S6, CPU 11 sets and displays on the input unit 18 the circular area 120 (Refer to FIG. 1*a*) on the image data of a photographic image obtained at step S2 (step S7), wherein the circular area has the center at a specified area where the touch operation is performed by the user at step S5 and defines a predetermined range. The "predetermined range" initially has a range which is defined by a circle with a predetermined radius and having the center at a specific area, and is enlarged or reduced in wide in response to the touch operation performed by the user or in the process performed by CPU 11. In other words, CPU 11 performs the process at step S7 to function as a selection-range setting unit for defining a predetermined range. In the present embodiment, when it is determined that the flag is set to "0" (YES at step S6), CPU 11 determines that the touch operation performed at step S5 is the selection touch operation and sets a circular area in the image data (step S7). Meanwhile, when it is determined that the flag is set to "1" (NO at step S6), CPU 11 determines that the touch operation performed at step S5 is the enlarging touch operation or reducing touch operation.

CPU 11 sets "1" to the flag stored in the storing unit 19 (step S8), and CPU 11 performs the following processes on the assumption that the circular area 120 has been set.

Figure 4:
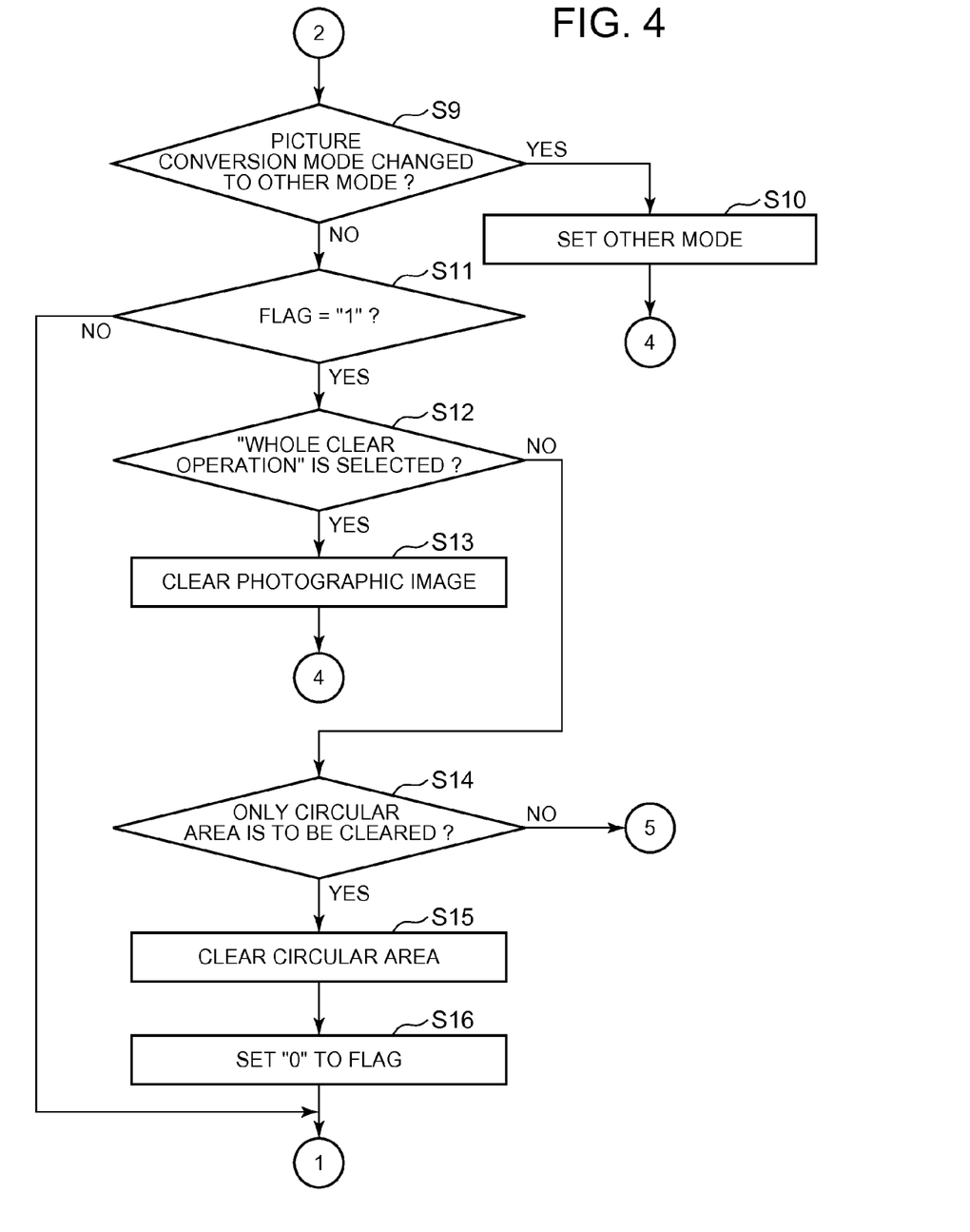

Now, the processes at step S9 to step S16 will be described with reference to the flow chart shown in FIG. 4. CPU 11 judges whether or not the picture conversion mode has been changed to other mode (step S9). When it is determined that the picture conversion mode has been changed to other mode (YES at step S9), CPU 11 advances to step S10. When it is determined that the picture conversion mode has not been changed to other mode (NO at step S9), CPU 11 advances to step S11. In the present embodiment, the "other mode" is the normal mode, in which images represented by plural pieces of image data stored in the storing unit 19 are successively displayed in the slid show manner.

When it is determined that the picture conversion mode has been changed to other mode (YES at step S9), CPU 11 sets the mode of the image processing apparatus 1 to the other mode (step S10).

Meanwhile, when it is determined that the picture conversion mode has not been changed to other mode (NO at step S9), CPU 11 judges whether or not "1" has been set to the flag stored in the storing unit 19 (step S11). When it is determined that "1" has been set to the flag (YES at step S11), CPU 11 advances to step S12. When it is determined that "1" has not been set to the flag (NO at step S11), CPU 11 returns to step S4 in FIG. 3.

CPU 11 judges whether or not a "whole-clear operation" (herein after, a "whole clear") has been selected in response to the selection touch operation by the user (step S12). When it is determined that the "whole clear" has been selected (YES at step S12), CPU 11 advances to step S13. When it is determined that the "whole clear" has not been selected (NO at step S12), CPU 11 advances to step S14. In the present embodiment, the "whole-clear operation" ("whole-area clear") clears the whole photographic image displayed on the output unit 17 at step S3 and also clears the circular area set at step S7.

CPU 11 clears the photographic image which is displayed on the output unit 17 at step S3 (step S13), and returns to step S2 in FIG. 2. CPU 11 also clears the circular area set at step S7 together with the photographic image (step S13).

When it is determined that the "whole-area clear" has not been selected (NO at step S12), or when the photographic image displayed on the output unit 17 is not cleared, CPU 11 judges whether or not a "circular-area clear operation" (herein after, a "circular-area clear") has been selected to clear only the circular area set at step S7 excepting the photographic image displayed on the output unit 17 at step S3 (step S14). When it is determined that the "circular-area clear" has been selected (YES at step S14), CPU 11 advances to step S15. When it is determined that the "circular-area clear" has not been selected (NO at step S14), CPU 11 advances to step S21 in FIG. 6.

When it is determined YES at step S14, CPU 11 clears only the circular area set at step S7 (step S15), and sets "0" to the flag stored in the storing unit 19 (step S16), thereby CPU 11 determines that the circular area 120 has not been set in the following processes. Then, CPU 11 returns to step S4 in FIG. 3.

Figure 5:
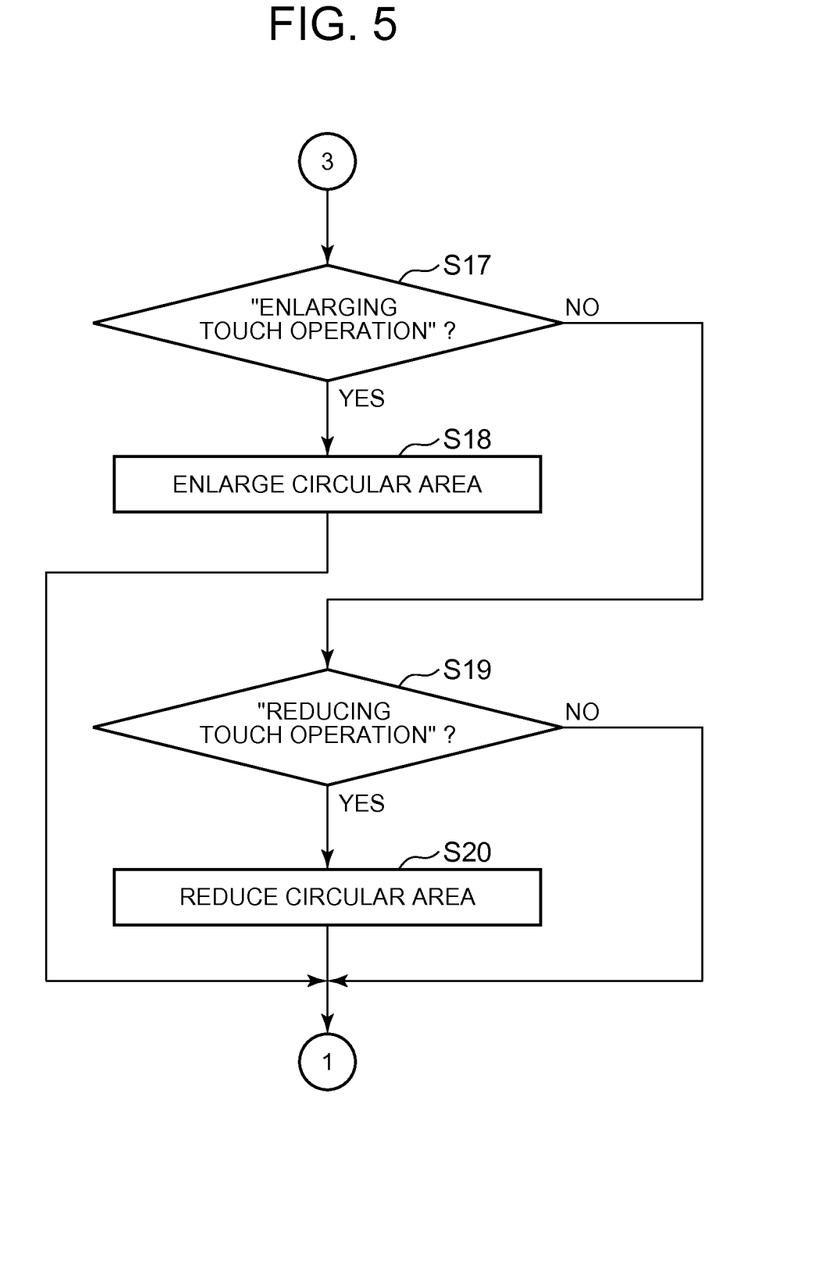

Now, the processes at step S17 to step S20 will be described with reference to the flow chart shown in FIG. 5. CPU 11 judges whether or not the "enlarging touch operation" has been performed on the input unit 18 by the user (step S17). When it is determined that the "enlarging touch operation" has been performed (YES at step S17), CPU 11 advances to step S18. Meanwhile, when it is determined that the "enlarging touch operation" has not been performed (NO at step S17), CPU 11 advances to step S19.

When it is determined YES at step S17, CPU 11 enlarges the circular area 120 in accordance with a sliding distance between the finger tips spread in the user's enlarging touch operation and displays the enlarged circular area on the output unit 17 (step S18), wherein the circular area 120 (Refer to FIG. 1*a*) originally defines the predetermined range set at step S7 or an enlarged or reduced predetermined range. Then, CPU 11 returns to step S4 in FIG. 3.

When it is determined NO at step S17, CPU 11 judges whether or not the "reducing touch operation" has been performed on the input unit 18 by the user (step S19). When it is determined that the "reducing touch operation" has been performed (YES at step S19), CPU 11 advances to step S20. Meanwhile, when it is determined that the "reducing touch operation" has not been performed (NO at step S19), CPU 11 returns to step S4 in FIG. 3.

When it is determined YES at step S19, CPU 11 reduces the circular area 120 in accordance with a sliding distance between the finger tips moved closer in the user's reducing touch operation and displays the reduced circular area on the output unit 17 (step S20), wherein the circular area 120 (Refer to FIG. 1*a*) originally defines the predetermined range set at step S7 or an enlarged or reduced predetermined range. Then, CPU 11 returns to step S4 in FIG. 3. As described above, CPU 11 performs the process at step S18 or step S20, thereby serving as the selection-range setting unit for enlarging or reducing the defined predetermined range.

Figure 6:
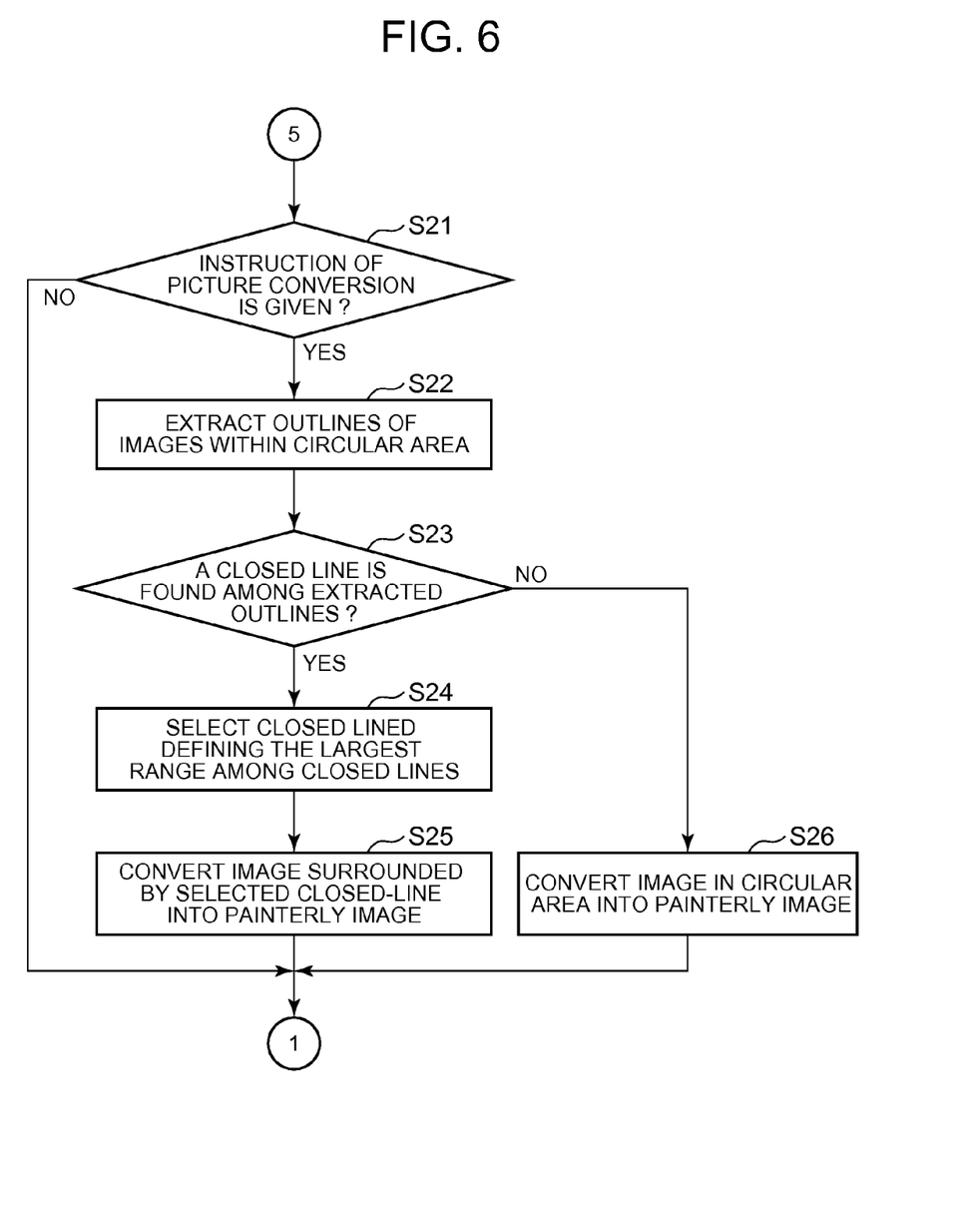

The processes at step S21 to step S26 will be described with reference to the flow chart shown in FIG. 6. CPU 11 judges whether or not an instruction of a picture conversion has been given from the input unit 18 (step S21). When it is determined that the instruction of a picture conversion has been given (YES at step S21), CPU 11 advances to step S22. Meanwhile, when it is determined that the instruction of a picture conversion has not been given (NO at step S21), CPU 11 returns to step S4 in FIG. 3.

When it is determined YES at step S21, CPU 11 extracts outlines of photographic images falling within the circular area, which is set at step S7, wherein the circular area defines the predetermined range (step S7) or an enlarged or reduced range (step S18) on the image data obtained at step S2 (step S22). The method of extracting the outlines of objects is not limited to a specific one, but for instance, CPU 11 extracts the outlines of images with use of pixel values of edges of the photographic image. As described above, CPU 11 performs the process at step S22, thereby serving as an outline extracting unit for extracting the outlines of the images within the predetermined range defined by the selection-range setting unit.

CPU 11 judges whether or not a closed line is found among the outlines of the images extracted at step S22 (step S23). When it is determined that a closed line is found (YES at step S23), CPU 11 advances to step S24. Meanwhile, when it is determined that a closed line is not found (NO at step S23), CPU 11 advances to step S26. CPU 11 performs the process at step S23, thereby serving as a closed-line judging unit for judging whether or not a closed line is found among the outlines of the images extracted by the outline extracting unit. The "closed line found among the outlines of the images" corresponds to the specific object 110 shown in FIG. 1*b*.

CPU 11 selects the closed line which defines the largest range from among the closed outlines, which are found at step S23 (step S24). CPU 11 performs the process at step S24, thereby serving as a closed-line selecting unit for selecting a closed line from among the outlines of the images extracted by the outline extracting unit. Further, CPU 11 performs the process at step S24, thereby serving as the closed-line selecting unit for selecting the closed line which defines the largest range from among the outlines of the images extracted by the outline extracting unit.

The image processing unit 14 cooperates with CPU 11 to perform the picture conversion on image data of a part surrounded by the closed line selected by the closed-line selecting unit, generating data of a painterly rendering image (step S25), wherein the part is a portion of the image represented by the image data obtained at step S2. And the image processing unit 14 displays on the output unit 17 a painterly rendering image represented by the generated data of a painterly rendering image. More specifically, the image processing unit 14 converts the object 110 surrounded by the closed broken line 120 in the photographic image shown in FIG. 1*a* into a painterly rendering image and displays the converted painterly rendering image on the output unit 17. The image processing unit 14 and CPU 11 operate together to perform the process at step S25, thereby serving as a picture converting unit for converting data of the object surrounded by the closed line selected by the closed-line selecting unit into a painterly rendering image.

In the image processing apparatus 1 according to the present embodiment, the image processing unit 14 operates in the following manner to display the image on the output unit 17 at step S25.

At first, the image processing unit 14 weakly displays the whole photographic image and then starts the picture conversion of the image. The image processing unit 14 gradually lightens the displayed photographic image with the advance of the picture conversion of the image, and returns to display the photographic image in normal depth in time with completion of the picture conversion of the photographic image. Further, before starting the picture conversion, the image processing unit 14 weakly displays the part surrounded by the closed line to be subjected to the picture conversion, and gradually lightens the displayed part with the advance of the picture conversion, and returns to display the part in normal depth in time with completion of the picture conversion of the part.

When it is determined that a closed line is not found (NO at step S23), the image processing unit 14 operates with CPU 11 to convert image data of a part of a photographic image to obtain data of a painterly rendering image (step S26), wherein the part is defined by either one of the circular area set at step S7, the circular area enlarged in wide at step S18, and the circular area reduced in wide at step S20. The image processing unit 14 displays on the output unit 17 a painterly rendering image represented by the obtained data of a painterly rendering image. The image processing unit 14 and CPU 11 operate together to perform the process at step S26, thereby serving as the picture converting unit for converting image data of the part defined by the predetermined range to a painterly rendering image, when the closed-line judging unit determines that no closed line is found.

Now, an application of the present embodiment of the invention will be described.

Figure 7A:
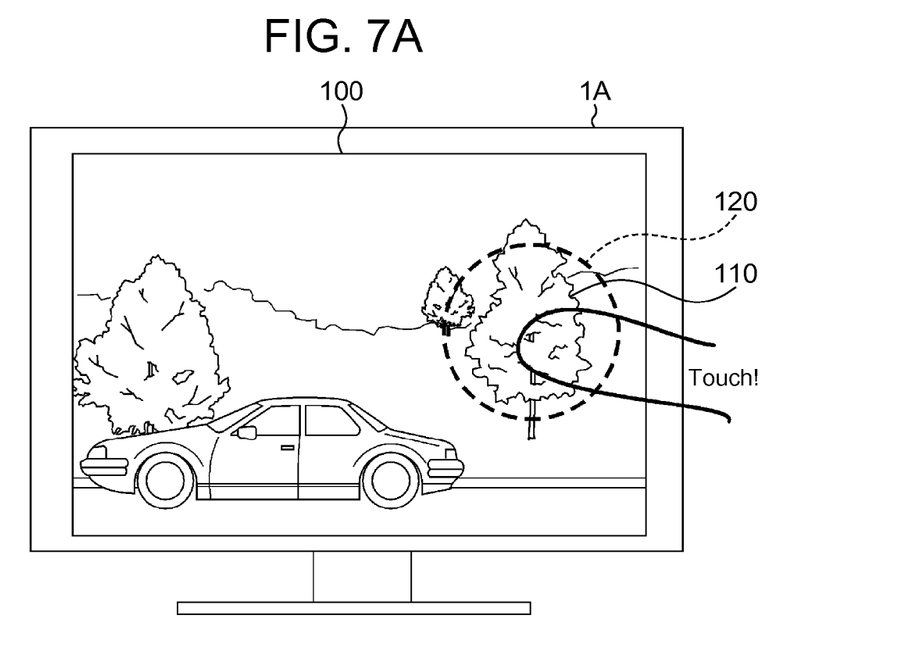
FIG. 7a and FIG. 7b are views showing photographic images displayed on an output unit of the application of the image processing apparatus according to the embodiment of the invention.
Figure 7B:
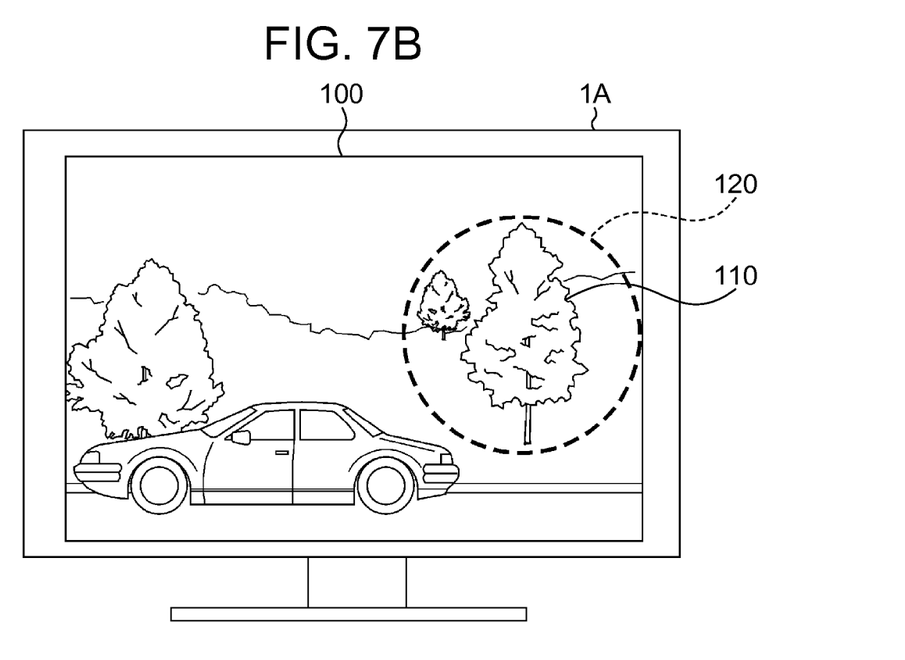

FIG. 7*a* and FIG. 7*b* are views for explaining the outline of the function of an image processing apparatus 1A, which is different from the image processing apparatus 1. FIG. 7*a* and FIG. 7*b* are views showing a photographic image 100 displayed on an output unit of the image processing apparatus 1A.

The image processing apparatus 1A or one application of the present embodiment is different in its function from the image processing apparatus 1.

In the case where the range defined by the circular area 120 set in response to the user's touch operation is smaller than the area defined by the outline of the object 110 as shown in FIG. 7*a*, the image processing apparatus 1A has a function that enlarges the circular area 120 so as to include the object 110 in the range, as shown in FIG. 7*b*.

Hereinafter, the operation of the image processing apparatus 1A will be described with reference to FIGS. 8 and 9 in detail. In the following description, like references in the image processing apparatus 1 are used to indicate like elements and processes in the image processing apparatus 1A, and a further description thereof will be omitted.

Figure 8:
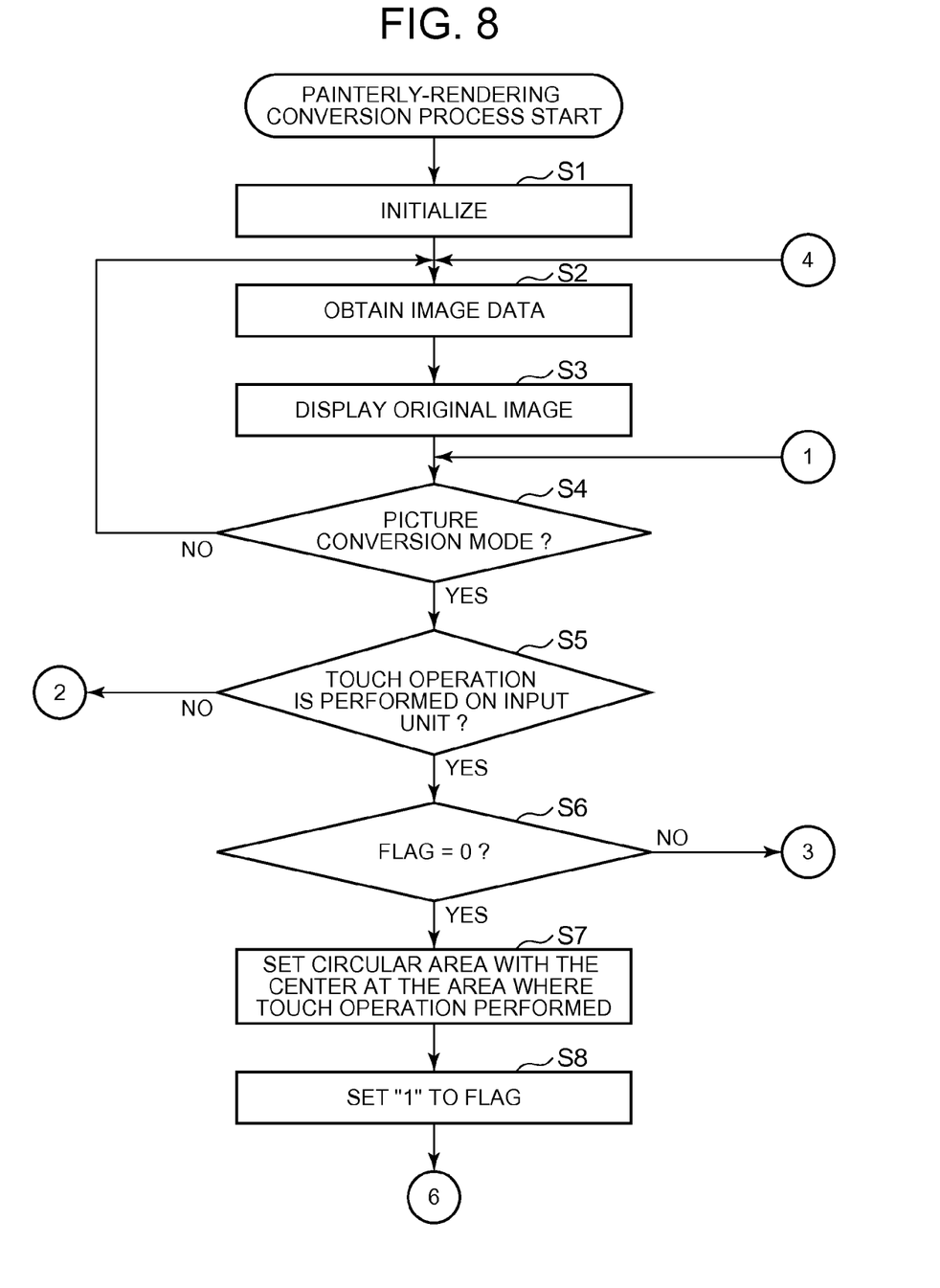
FIG. 8 and FIG. 9 are flow chats of the painterly-rendering conversion process performed by CPU in the application of the image processing apparatus according to the embodiment of the invention.
Figure 9:
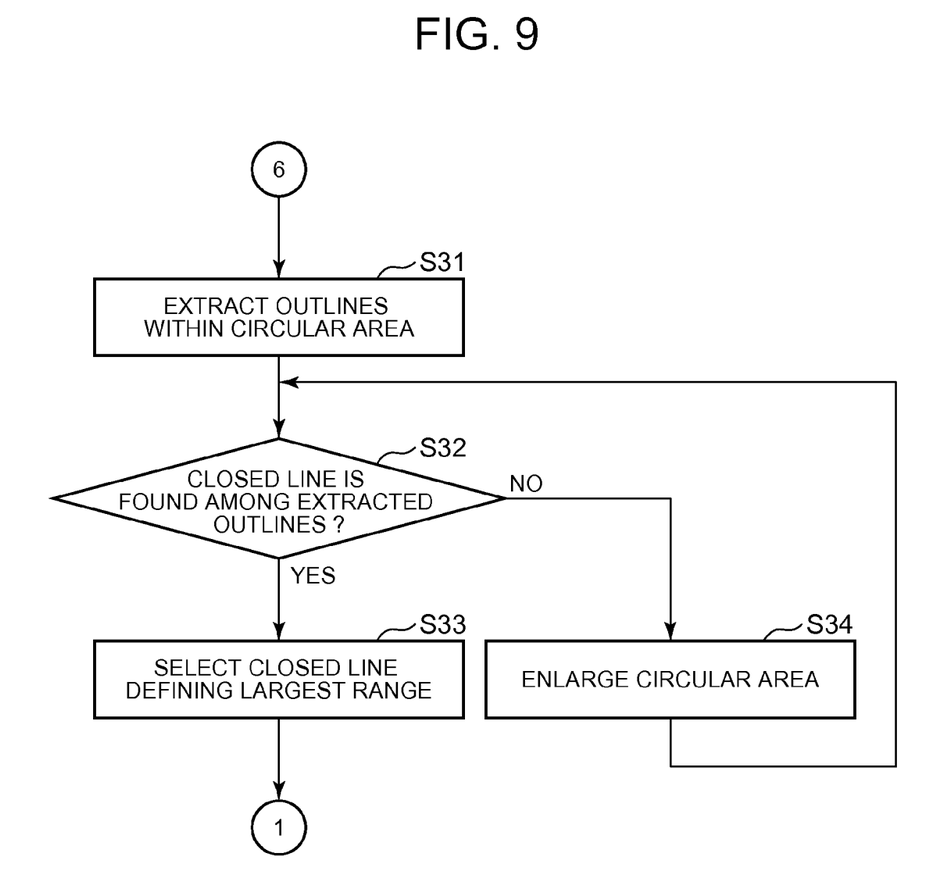

FIG. 8 and FIG. 9 are flow chats of the painterly-rendering conversion process performed by CPU 11 in the image processing apparatus 1A according to the application of the present embodiment of the invention. CPU 11 in the image processing apparatus 1A performs the process at step S8 in FIG. 8, and then performs the processes at steps S31 to S34. In the processes, CPU 11 returns to step S4 after the process at step S33, which is different from the image processing apparatus 1.

The processes at step S31 to S34 will be described with reference to the flow chart of FIG. 9. CPU 11 extracts outlines of photographic images within the predetermined range defined by the circular area set at step S7 in FIG. 8 (step S31 in FIG. 9).

CPU 11 judges whether or not a closed outline defining a range is found among the outlines extracted at step S31 (step S32). When it is determined that a closed outline is found (YES at step S32), CPU 11 advances to step S33. Meanwhile, when it is determined that a closed outline is not found (NO at step S32), CPU 11 advances to step S34. That is, CPU 11 performs the process at step S32, thereby serving as the closed-line judging unit for judging whether or not a closed line is found among the outlines of the images extracted by the outline extracting unit.

When it is determined YES at step S32, CPU 11 selects the closed line which defines the largest range from among the closed lines, which are found at step S32 (step S33). In the image processing apparatus 1A, the closed line selected at step S33 is used as a candidate of an image to be subjected to the picture conversion at step S25 in FIG. 6 and stored in the storing unit 19. Thereafter, when the enlarging touch operation or the reducing touch operation is not performed on the circular area 120, CPU 11 reads from the storing unit 19 the closed line selected at step S33 (step S24). The image processing unit 14 and CPU 11 operate together to convert image data of the part surrounded by the closed line read at step S24 into painterly-rendering image data and display a painterly-rendering image represented by the painterly-rendering image data on the output unit 17 (step S25).

When it is determined that a closed outline is not found (NO at step S32), CPU 11 enlarges the circular area 120 by a given amount and displays the enlarged circular area on the output unit 17 (step S34), wherein the circular area 120 is set at step S7 to define the initial predetermined range (Refer to FIG. 7b). Then, CPU 11 returns to step S32. In other words, CPU 11 enlarges the circular area so as to include the closed outline extracted at step S31 in the predetermined range.

CPU 11 performs the process at step S34, thereby serving as the selection-range setting unit for enlarging the predetermined range, when the closed-line judging unit determines that a closed line is not found among the outlines of the images extracted by the outline extracting unit.

As described above, the image processing apparatus 1 according to the present embodiment comprises CPU 11 and the image processing unit 14.

CPU 11 performs the process at step S7, thereby serving as the selection-range setting unit for defining a predetermined range in the obtained image data.

CPU 11 performs the process at step S22, thereby serving as the outline extracting unit for extracting the outlines of the images within the predetermined range defined in the obtained image data by the selection-range setting unit.

CPU 11 performs the process at step S24, thereby serving as the closed-line selecting unit for selecting a closed line from among the outlines of the images extracted by the outline extracting unit.

The image processing unit 14 and CPU 11 operate together to perform the process at step S25, thereby serving as the picture converting unit for converting image data of the part surrounded by the closed line selected by the closed-line selecting unit in the obtained image data into painterly-rendering image data.

As described above, with use of the image processing apparatus 1, since only the data of the part surrounded by the closed line within the predetermined range is converted into a painterly rendering image, for example, only a specified object in a photographic image can be converted into a painterly rendering image, and further a time, which is required in the image processing for converting a photographic image into a painterly rendering image, can be reduced. Therefore, when only an image of a specific object in a photographic image is converted with the user's feeling incorporated into a painterly rendering image and the painterly rendering image is merged with a clear photographic image, this resultant image will provide the user with specific appreciating enjoyment, which the user cannot enjoy when viewing the photographic image and the painterly rendering image separately.

CPU 11 performs the process at step S24, thereby serving as the closed-line selecting unit for selecting the closed line defining the largest range from among the closed outlines of the images extracted by the outline extracting unit.

In general, photographical pictures include a sub object in addition to a main object, and the main object is larger than the sub object.

In the image processing apparatus 1 according to the present embodiment, since the closed line defining the largest range is selected and the image of the part enclosed by the selected closed-line is converted into a painterly rendering image, an object likely to be the main object in the photographical image can be preferentially converted into a painterly rendering image.

CPU 11 performs the process at step S18 or step S20, thereby serving as the selection-range setting unit for enlarging or reducing the defined predetermined range. With use of the selection-range setting unit, since the user's desired object can be included in the predetermined range, only the user's desired object can be converted into a painterly rendering image.

Further, CPU 11 performs the process at step S23, thereby serving as the closed-line judging unit for judging whether or not a closed line is found among the outlines of the images extracted by the outline extracting unit.

The image processing unit 14 and CPU 11 operate together to perform the process at step S26, thereby serving as the picture converting unit for converting image data of the part defined by the predetermined range into a painterly rendering image, when the closed-line judging unit determines that no closed line is found.

With use of the above picture converting unit, even if no closed line is found within the predetermined range, only the range including the desired object can be converted into a painterly rendering image.

CPU 11 in the application of the image processing apparatus 1 (that is, CPU 11 in the image processing apparatus 1A) performs the process at step S32, thereby serving as the closed-line judging unit for judging whether or not a closed line is found among the outlines of the images extracted by the outline extracting unit.

CPU 11 in the application of the image processing apparatus 1 (that is, CPU 11 in the image processing apparatus 1A) performs the process at step S34, thereby serving as the selection-range setting unit for enlarging the predetermined range, when the closed-line judging unit determines that a closed line is not found among the outlines of the images extracted by the outline extracting unit.

With use of the selection-range setting unit, when the closed-line judging unit determines that a closed line is not found among the outlines of the images extracted by the outline extracting unit, since the predetermined range can be enlarged to include the user's desired object therein, the object to be subjected to the picture conversion can be selected without failure.

It will be understood that the invention is not limited to the particular embodiment and application described herein, but numerous rearrangements, modifications, and substitutions can be made to the embodiment and the application without departing from the scope of the invention.

In the embodiments described above, the predetermined range is defined by using the circular area, but the predetermined range is not limited to the circular area and can be a rectangle area or an area defined by the user's touch operation.

In the embodiment and its application described above, the part surrounded only by the closed outline is converted into a painterly rendering image but the invention is not limited to the embodiment and its application, and a modification can be made such that a part surrounded by an outer line of the closed outline and the circular area is converted into a painterly rendering image.

In the above description, the invention is described, which is used in the image processing apparatuses 1 and 1A applied as a so-called "digital photo-frame", but the invention is not limited to the particular embodiments.

For example, the invention can be used in general electronic apparatuses having a displaying function. More particularly, the invention can be applied to note-type personal computers, television receivers, video cameras, portable navigation devices, cellular phones, portable game machines, etc.

The series processes described above can be performed not only by hardware but also by software. Each of the units in the image processing apparatus 1 can be composed of hardware only or made of software only, but can be composed of a combination of software and hardware.

In the case where the series of processes are performed by software, the software or a computer program is installed onto a computer via a network or from a recording medium. The computer can be one mounted on a specialized hardware or one installed with various sorts of programs for executing various functions, for example, the computer can be a general-purpose computer.

The recording medium having the computer recorded thereon can be composed not only of the removable medium 31 shown in FIG. 2, which is distributed to the users separately from the image processing apparatus 1 or 1A, but also of the medium previously mounted on the image processing apparatus 1 or 1A. For example, the removable media 31 are composed of magnetic disks (including floppy disks), optical disks, and/or optical magnetic disks. The optical disk is composed of CD-ROM (Compact Disk Read Only Memory) and/or DVD (Digital Versatile Disk). The optical magnetic disk is composed of MD (Mini-Disk). The recording medium, which is previously mounted on the image processing apparatus 1 or 1A to be supplied to the users, is composed of ROM 12, in which the program is recorded as shown in FIG. 2, and/or composed of a hard disk included in the storing unit 19 as shown in FIG. 2.

In the description given herein, the computer program recorded in the recording medium includes processes to be performed in a time series and also processes to be performed in parallel or separately.

Although specific embodiments of the present invention and their applications have been shown in the accompanying drawings and described in the above detailed description, it will be understood that the invention is not limited to the particular embodiments and applications described herein, but numerous rearrangements, modifications, and substitutions can be made to them without departing from the scope of the invention. The following claims are intended to encompass all such modifications.

What is claimed is:

1. An image processing apparatus comprising:
   a selection-range setting unit for defining a predetermined range in an obtained image;
   an outline extracting unit for extracting outlines of images falling within the predetermined range defined by the selecting range setting unit;
   a closed-line judging unit for determining whether a closed line is found among the extracted outlines; and
   a picture converting unit for, when the closed-line judging unit determines that the closed line is found, converting an image surrounded by the closed line into a painterly rendering image,
   wherein, when the closed-line judging unit determines that no closed line is found among the extracted outlines, the predetermined range is enlarged, and the outline extracting unit extracts outlines of images falling within the enlarged range.

2. The image processing apparatus according to claim 1, further comprising a closed-line selecting unit for selecting a closed line from among the outlines extracted by the outline extracting unit,
   wherein the picture converting unit converts the image surrounded by the closed line selected by the closed-line selecting unit into a painterly rendering image.

3. The image processing apparatus according to claim 1, wherein the selection-range setting unit changes in width the predetermined range in the obtained image.

4. The image processing apparatus according to claim 1, wherein the picture converting unit converts an image of a part defined by the predetermined range in the obtained image into a painterly rendering image, when the closed-line judging unit determines that no closed line is found among the outlines extracted by the outline extracting unit.

5. The image processing apparatus according to claim 2, wherein the closed-line selecting unit selects a closed line which defines a largest range from among plural closed lines extracted by the outline extracting unit.

6. An image processing method in an image processing apparatus, the method comprising:
   defining a predetermined range in an obtained image;
   extracting outlines of images falling within the defined predetermined range;
   determining whether a closed line is found among the extracted outlines;
   when no closed line is determined to be found among the extracted outlines,
   enlarging the predetermined range and returning to the extracting step using the enlarged range; and
   when a closed line is determined to be found among the extracted outlines,
   converting an image surrounded by the closed-line into a painterly rendering image.

7. A non-transitory computer readable recording medium mountable on an image processing apparatus provided with a computer, the recording medium having recorded thereon a computer program which is executable to control the computer to function as:
- a selection-range setting unit for defining a predetermined range in an obtained image;
- an outline extracting unit for extracting outlines of images falling within the predetermined range defined by the selection-range setting unit;
- a closed-line judging unit for determining whether a closed line is found among the extracted outlines; and
- a picture converting unit for, when the closed-line judging unit determines that the closed line is found, converting an image surrounded by the closed line into a painterly rendering image,
- wherein, when the closed-line judging unit determines that no closed line is found among the extracted outlines, the predetermined range is enlarged, and the outline extracting unit extracts outlines of images falling within the enlarged range.

* * * * *